United States Patent [19]

Cavalluzzi

[11] 3,985,069
[45] Oct. 12, 1976

[54] COFFEE BEVERAGE DRIP BREWER

[76] Inventor: Frank J. Cavalluzzi, 143-35 Quince Ave., Flushing, N.Y. 11355

[22] Filed: Dec. 3, 1973

[21] Appl. No.: 420,871

[52] U.S. Cl. ................................ 99/295; 99/306; 426/77
[51] Int. Cl.² .......................................... A23F 1/00
[58] Field of Search ............. 99/306, 295, 304, 322, 99/323, 287, 295; 426/77

[56] References Cited
UNITED STATES PATENTS

| | | | |
|---|---|---|---|
| 1,920,268 | 8/1933 | Moriya | 99/306 X |
| 2,429,116 | 10/1947 | Battilani | 99/322 X |
| 2,743,664 | 5/1956 | Dale | 99/306 X |
| 2,814,245 | 11/1957 | Courtney | 99/323 X |
| 2,885,290 | 5/1959 | Krasker | 99/306 X |
| 3,083,101 | 3/1963 | Noury | 99/295 X |
| 3,334,574 | 8/1967 | Douglas | 99/304 |
| 3,343,682 | 9/1967 | Harvith | 99/295 X |
| 3,389,650 | 6/1968 | Michielsen | 99/295 |
| 3,445,237 | 5/1969 | Gidge | 99/295 X |
| 3,490,356 | 1/1970 | Peterson et al. | 99/295 X |
| 3,811,373 | 10/1971 | Telco | 99/306 X |

FOREIGN PATENTS OR APPLICATIONS

| | | | |
|---|---|---|---|
| 1,289,610 | 2/1962 | France | 99/295 |

Primary Examiner—Peter Feldman
Assistant Examiner—Donald B. Massenberg
Attorney, Agent, or Firm—Natter & Natter

[57] ABSTRACT

A drip brewer is formed with a frusto-conical body adapted to seat over an empty vessel. The lower end of the body includes an infusion chamber covered with a snap fit perforated disc and carrying a measure of loose, i.e. not compacted, roasted and ground coffee with the coffee occupying less than the full chamber volume. Control of brewing water flow into the chamber, wetting and expansion of imbued coffee and flow of the brewage out of the lower end of the chamber result in optimum extraction rate and a predetermined volume of freshly brewed coffee beverage being collected in the vessel.

8 Claims, 7 Drawing Figures

U.S. Patent  Oct. 12, 1976  Sheet 1 of 2  3,985,069
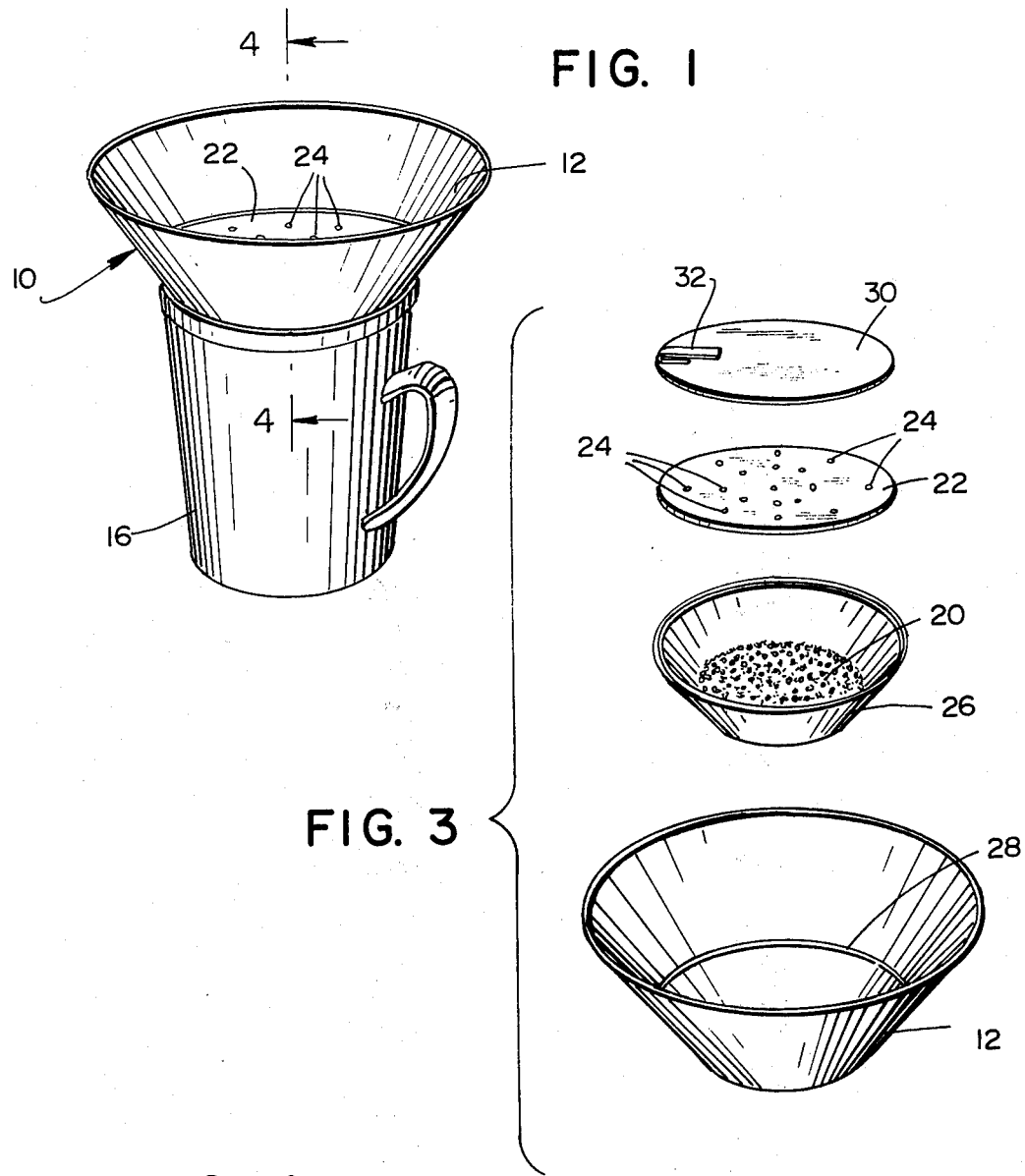
FIG. 1
FIG. 3
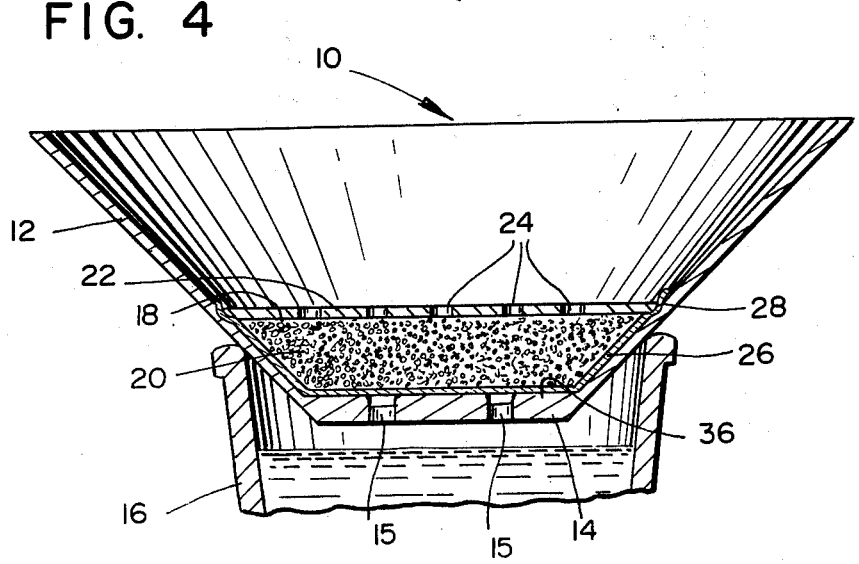
FIG. 4

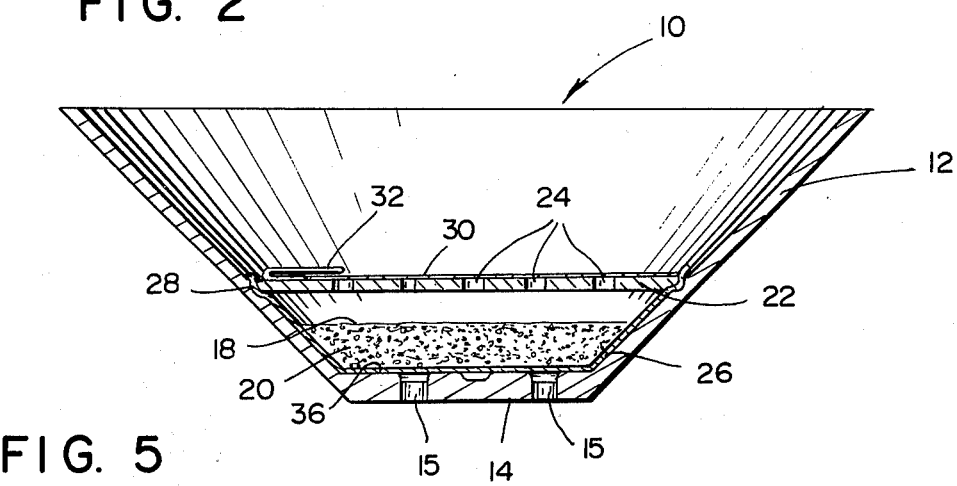
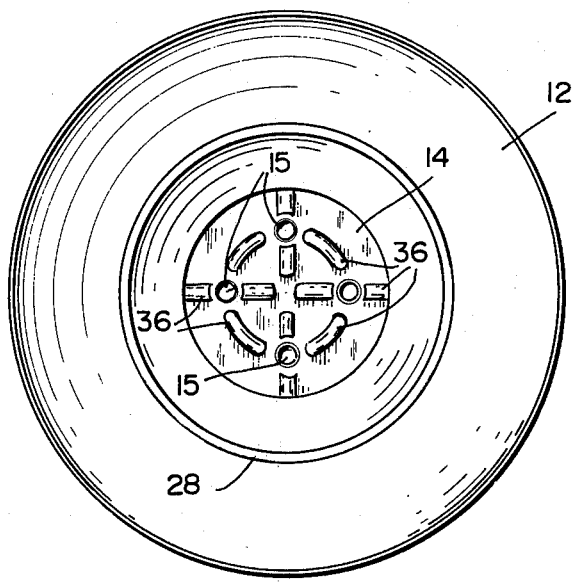
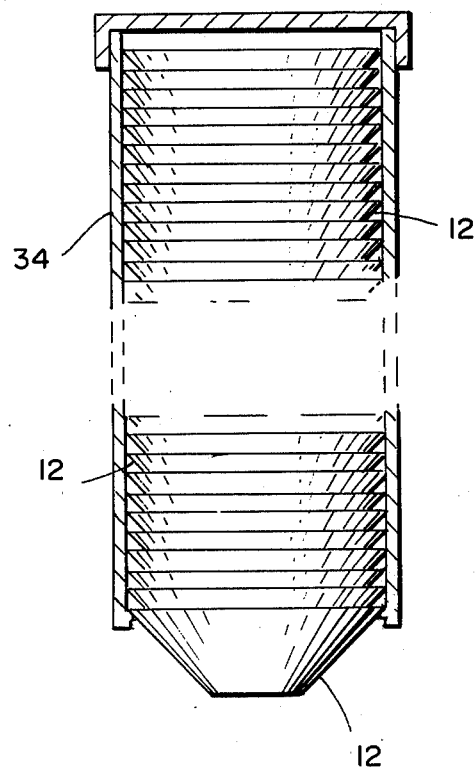
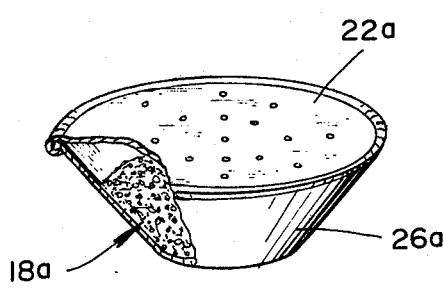

COFFEE BEVERAGE DRIP BREWER

BACKGROUND OF THE INVENTION

1. Field of the Invention

The invention relates generally to coffee brewing devices of the infusion or drip type and more specifically to devices which are adapted to brew and deposit a single serving of coffee beverage into a drinking cup.

2. Brief Description of the Prior Art

Generally, devices which brew coffee in accordance with the drip method were designed to permit the passage of a premeasured quantity of hot water through a quantity of roasted and ground coffee and into a lower collection vessel. During the brewing process the brewing water flowed by gravity through a predetermined course.

In some of the prior drip method brewing devices, the coffee was positioned within a basket and was separated from both the brewing water and the collection container by perforated walls which permitted the passage of the brewing water and coffee beverage.

Further drip brewing apparatus permitted the immediate comingling of brewing water and coffee, yet provided filtration means to remove coffee grounds from the coffee beverage. The filtration means generally used was a paper filter disc, usually folded to a conical shape so that it generally conformed to a conical water container.

With the use of some of these previous drip brewing devices, the coffee brewage from a given measure of coffee often tended to be generally weaker than that utilizing alternate brewing apparatus and additional quantities of coffee were necessary to provide a satisfactory brew. This was in part attributable to the uncontrolled expansion of the coffee upon contact with the hot water resulting in an unfavorable extraction rate. Thus, if one desired a coffee beverage of a particular strength, often more coffee would be needed when utilizing a drip brewer than when, for instance, utilizing a perk method brewer.

Although drip brewing devices have been provided in small sizes which were particularly adapted for single servings, these devices did not gain widespread acceptance for a number of reasons. Initially, it should be appreciated that the unfavorable extraction rate was not compensated or rectified with prior single serving drip brewers.

Some single serving disposable devices included a premeasured packet of ground coffee. In order to provide effective extraction, the filter bags or other filter containers within which the coffee was carried required relatively large openings. Unfortunately, the mesh size required permitted the settling of coffee fines through the filter during shipping and handling. This condition was commonly termed dusting and, of course, was undesirable.

A further problem encountered with single serving drip brewing devices, especially with disposable or throwaway types, was that costs could not be brought to commercially feasible levels. In fact, the estimated retail prices of these prior devices were comparable to restaurant prepared coffee beverage obtained at take-out counters. When weighing this factor with the inconvenience of heating water for single serving brewers and the cleaning up of cups and utensils, it is not surprising that such prior brewers were not accepted.

A further problem encountered with prior single serving drip brewers was that several were either designed to fit only over a specific size companion drinking vessel or were so constructed as to be only usable with a limited range of cup shapes and/or sizes.

With the nondisposable drip brewers, the inconvenience of measuring the ground coffee and cleaning up the coffee grinds after usage overcame the taste advantage of utilizing fresh ground coffee for drip method single serving brewers. A further factor relating to the lack of commercial success was that the ease and convenience of making a coffee beverage with instant coffee far outweighed the palatable advantages of single serving brewed coffee.

SUMMARY OF THE INVENTION

A disposable drip coffee brewer adapted to brew a single serving of coffee beverage over and serve the beverage directly into a cup or other drinking vessel is designed to seat atop the open mouth of a vessel. A charge of hot brewing water is deposited in the upper portion of a frusto-conical body of a brewer and enters a lower infusion chamber which carries a measure of loose roasted and ground coffee. The chamber volume is such that limited expansion of the ground coffee upon absorption of the brewing water is permitted with such expansion controlled so as to achieve the desired coffee extraction rate. In assembly of the brewer, ground coffee is positioned within a cup formed of a liquid permeable filter material and emplaced adjacent the lowermost (minimum diameter) end of the frusto-conical body. The cup is covered and sealed with a perforated partition disc which is snap fitted in the interior of the body to form an upper wall of an infusion chamber.

To preserve freshness of the coffee and prevent coffee fines from being dispersed, the apertures of the partition are sealed with a tear tape which is removed prior to filling the body with brewing water while the apertures at the bottom of the body are sealed by being nestably received within a similar frusto-conical body of like brewers during shipment and storage.

From the above summary, it will be appreciated that it is the object of the present invention to provide a coffee beverage drip brewer of the general character described which is so constructed that it is not subject to any of the aforementioned disadvantages.

It is a further object of this invention to provide a coffee beverage drip brewer of the general character described which is practical, lends itself to economical mass production fabrication techniques, is commercially feasible and low in cost.

A still further object of the present invention is to provide a coffee beverage drip brewer of the general character described which is simple to use and yet eliminates the messy clean up normally encountered after brewing coffee.

Another object of the present invention is to provide a coffee beverage drip brewer of the general character described which is adapted to be emplaced over a drinking cup and serve freshly brewed coffee beverage into the cup while being discardable after a single use.

Yet another object of the present invention is to provide a coffee beverage drip brewer of the general character described which achieves an optimum coffee extraction rate while minimizing unpleasant tastes in the brewage.

3

Still a further object of the present invention is to provide a coffee beverage drip brewer of the general character described wherein the brewing process is controlled to provide a coffee beverage of robust flavor, brewed in but a minimal amount of time.

Other objects of the invention in part will be obvious and in part will be pointed out hereinafter.

With these ends in view, the invention finds embodiment in certain combinations of elements and arrangements of parts by which the said objects and certain other objects are hereinafter attained, all as fully described with reference to the accompanying drawings and the scope of which is more particularly pointed out and indicated in the appended claims.

BRIEF DESCRIPTION OF THE DRAWINGS

In the accompanying drawings in which are shown some of the various possible exemplary embodiments of the invention, FIG. 1 is a perspective view of a coffee beverage drip brewer constructed in accordance with and embodying the invention with the brewer positioned atop a drinking mug and adpated for reception of a charge of hot brewing water;

FIG. 2 is an elevational sectional view of the drip brewer and showing the internal construction thereof prior to coffee brewing;

FIG. 3 is a perspective exploded view of the coffee brewer and illustrating several of the components thereof including a frusto-conical body adapted to receive a cup carrying a charge of ground coffee and locked into position within the lower portion of the body by a perforated partition disc, the perforations of which are exposed upon removal of a tear tape;

FIG. 4 is a sectional view through the drip brewer and drinking cup, the same being taken substantially along line 4—4 of FIG. 1, and showing the condition of the ground coffee after use;

FIG. 5 is a reduced scale plan view of the frusto-conical body of the brewer prior to assembly and illustrates an annular groove formed in the interior of the body and adapted to be engaged by the partition disc; additionally illustrated is the bottom wall of the body including a plurality of drainage openings and several ribs integral with and positioned along the bottom wall and adapted to facilitate outflow of the brewage;

FIG. 6 is a reduced scale fragmentary elevational sectional view through a typical dispenser adapted to nestably store a plurality of drip brewers constructed in accordance with the invention; and FIG. 7 is a perspective cut away view of an alternate embodiment of the invention wherein the cup carrying the ground coffee constitutes a single unit which includes a perforated cover and a tear tape for exposing the cover perforations.

DESCRIPTION OF THE PREFERRED EMBODIMENTS

Referring now in detail to the drawings, the reference numeral 10 denotes generally a drip brewer constructed in accordance with and embodying the invention.

The brewer 10 includes a frusto-conical body 12 with an open top and a lower end wall 14 having drainage openings 15. The body 12 is preferably formed of a liquid impermeable material having thermal insulating characteristics, e.g. styrofoam. In order to facilitate the positioning of the brewer 10 atop any one of a number of various sized drinking vessels, the wall or skirt of the body 12 is upwardly outwardly inclined at an angle of approximately 45° from horizontal. It will be appreciated that with an end wall 14 of a diameter in the order of one and one half inch and an upper diameter in the order of five inches, the brewer 10 can be easily seated over virtually any size drinking vessel from practically a demi-tasse cup to a large drinking mug.

It should also be appreciated that the frusto-conical body 12 of the brewer 10 provides a funnel passageway receiving a charge of hot brewing water and with the drainage openings 15 of the end wall 14 adapted to discharge the coffee beverage directly into a drinking vessel such as a mug 16.

An infusion chamber 18 is formed within the body 12 adjacent the end wall 14. The infusion chamber is adapted to receive a measure of loose roasted and ground coffee 20 and store such coffee in a fresh state while at the same time providing means whereby the coffee is utilized to provide a freshly brewed coffee beverage.

It will be initially observed that the infusion chamber 18 is bounded by the annular skirt of the body 12, the end wall 14, and a partition disc 22 having a plurality of perforations 24.

The loose roasted and ground coffee 20 is carried in a filter cup 26 as more clearly illustrated in FIG. 3. The cup 26 includes an open top and is preferably formed in one piece construction including a closed bottom and an annular outwardly flaring side wall. In order to permit the outflow of coffee beverage, yet retard the passage of spent coffee grinds into the drinking vessel, the cup 26 is constructed of a suitable filter medium, e.g. filtration paper.

The cup is so dimensioned as to be accommodatingly nested within the confines of the body 12 at the portion thereof forming the infusion chamber 18. The side walls of the cup 26 are adpated to be engaged between the partition disc 22 and an annular groove 28 extending about the inner face of the skirt of the body 12 and within which the partition disc 22 is snappingly engaged. The locking engagement between the partition disc, the filter cup and the groove 28 of the body 12 assures that only coffee beverage will be deposited in the drinking vessel. Thus, it can be seen that it will be virtually impossible for coffee grinds or foreign matter to pass through the drainage openings 15 in the end wall 14.

In order to preserve the freshness of the coffee measure 20 seated within the infusion chamber 18, the perforations 24 in the partition disc 22 are normally covered with an overlay of adhesive backed tape 30. Prior to pouring the hot brewing water into the brewer 10, the tape is easily removed by pulling a starting tear strip 32 positioned adjacent a peripheral edge of the tape 30.

It should also be appreciated that the drainage openings 15 in the end wall 14 will not provide atmospheric communication during normal storage and shipment of the brewer 10 since the brewers are preferably packaged and dispensed in a nested relationship as more particularly illustrated in FIG. 6. In this illustration, it will be seen that the end wall 14 of each brewer 10 except the lowermost brewer is nestably sealed against a brewer 10 positioned therebeneath.

Additionally illustrated in FIG. 6 is a typical dispenser 34 adpated to be mounted on a suitable supporting surface such as a wall through conventional securing devices (not shown). When the user desires to brew an individual serving of coffee, the lowermost brewer 10 is merely pulled from the open bottom end of the dispenser 34 and positioned atop a suitable drinking vessel. Optionally, the dispenser may include a lower end cap and may serve as a shipping container.

Returning now to the brewer 10, it has been previously mentioned that a desirable extraction rate is achieved through the controlled flow of hot brewing water throughout the brewer 10. Initially, a charge of hot brewing water is deposited within the upper portion of the brewer. This is preferably done rather so that the brewer can be practically filled to its upper edge before a significant amount of brewing water is allowed to flow into the infusion chamber through the perforations 24. Because the brewer is so geometrically proportioned as to accommodate a particular measure of water, e.g. 6 ½ ounces, the user can be assured that exactly enough coffee beverage will be deposited in the vessel without spillage or underfilling.

The apertures 24 in the partition disc 22 are designed to permit a desired rate of brewing water flow into the infusion chamber. Futhermore, the measure of coffee carried in the cup 26, e.g. 1/60 lb. to 1/45 lb., occupies approximately two thirds the total volumetric capacity of the infusion chamber such that normal swelling and expansion of the coffee 20 is permitted up to these limited confines. Upon contact with the hot brewing water, the coffee 20 will be permitted normal release of gasses and frothing to achieve the optimum extraction rate.

It should be noted that control of the flow rate of brewing water into the infusion chamber and control of expansion of the coffee are not the sole parameters in optimizing extraction rate. Extraction rate is also affected by the outflow rate of the coffee beverage. In this regard, it is worthy to note that there are but a limited number of drainage openings 15 through the end wall 14. For example, the end wall was more clearly illustrated in FIG. 5 includes four drainage openings. While the entire surface of the filter cup 26 is capable of allowing the passage of coffee brewage, the surfaces of the cup which are in abutting contact with the infusion chamber walls will not permit free flow of beverage. In order to achieve the desired flow rate, it has been found necessary to control the flow through the filter cup 26 by increasing the surface area of the free standing cup 26 beyond that which is exposed solely by the drainage openings 15.

This is desirably achieved by providing a plurality of ribs 36 across the end wall 14 to thereby elevate the bottom of the filter cup 26 above the surface of the end wall 14. Thus, unsupported filter surface area is increased since the ribs 36 support the cup in elevated position over the end wall 14. The ribs may also extend along the body skirt.

It should be appreciated that the geometric orientation of the ribs 36 is not of paramount significance, and the ribs are shown in exemplary fashion as extending both radially and concentrically across the upper surface of the end wall 14. it is of course desirable to form the ribs of integral unitary construction with the entire brewer body 10 which may be molded of styrofoam.

The ribs 36 are dimensioned to coordinate outflow rate of the coffee beverage through the openings 15 with flow of coffee beverage into the infusion chamber and flowage through the coffee to thereby optimize the rate of extraction.

With reference to FIG. 4 it will be seen that the expansion of the roasted and ground coffee 20 within the infusion chamber is preferably limited to 50% of its original volume. It should also be appreciated that while the tape 30 seals the apertures 24 through the partition disc 26, an underlay filter material may be positioned on the opposite side of the partition disc 22 to prevent the possible migration of coffee upwardly through the partition during the brewing stages. Coffee migration can also be controlled by suitably dimensioning the apertures 24 in the partition disc.

Additionally, it should be noted that the tape 20 itself may be eliminated without substantially affecting the operation of the brewer. As previously mentioned, the nested storage and dispensing arrangement will substantially seal the measure of coffee in the infusion chamber. This sealing is equally effective both on the top and the bottom of the infusion chamber.

The dusting problem is minimized and coffee freshness assured through the use of the tape 30 in conjunction with the nested packaging of successive brewers.

It should ne noted, additionally, that although the brewer 10 has been described as preferably a single use, throwaway device, a permanent brewer capacity is inherent. Thus the user need only replace filter cups 26 and charges of coffee if economies so necessitate. If the brewer is to be of a more permanent nature, the body 12 may be formed of metal, ceramic, glass, etc.

It has been found that a coffee beverage of truly robust flavor has been easily brewed using water of boiling temperature with the infusion chamber carrying a charge of 1/45 lb. of fine ground coffee.

An alternate embodiment of the invention is illustrated in FIG. 7. In this embodiment, a drip coffee brewer is formed with an infusion chamber 18a in cassette form adapted to be deposited into a brewer body which is substantially identical to the body of the previous embodiment. The brewer body of this embodiment may optionally differ in construction since the annular groove 28 need not be provided.

The chamber cassette 18a includes a filter cup 26a constructed in a manner similar to the cup 26 of a suitable filter medium such as filtration paper. The infusion chamber 18a includes a perforated lid 22a which is secured to the cup 26a. The lid 22a is preferably formed of a lightweight coated paperboard, and is joined at its annular peripheral edge to the skirt of the filter cup 26a as with an integral beaded fold as more particularly shown in FIG. 7. Thus the cassette 18a includes a chamber having a perforated lid 22a and a bottom of filter material.

Before securement of the lid 22a, the cup 26a is approximately ⅔ filled to capacity with a charge of dry coffee 18a. In a manner similar to that previously described, optimization of extraction rate is achieved through the controlled flow of boiling water into the infusion chamber, through the coffee charge and into the drinking vessel.

It can be readily appreciated that the cassette 18a carrying its charge of coffee can easily serve as a replaceable element for a permanent frusto-conical brewer. Thus, the cassette 18a is dropped into the brewer body, the brewing water added and, after the beverage is served in the vessel, the cassette only is discarded.

Thus, it will be seen that there is provided a coffee beverage drip brewer which achieves the various objects of the invention and which is well suited to meet the conditions of practical use.

As various changes might be made in the drip brewer as above set forth, it is to be understood that all matter herein described or shown in the accompanying drawings is to be interpreted as illustrative and not in a limiting sense.

Having thus described the invention, there is claimed as new and desired to be secured by Letters Patent:

1. A coffee beverage drip brewer adapted for the brewing of a single serving of the coffee beverage comprising a frustoconical body having an upwardly and outwardly flaring skirt extending from a generally planar circular end and terminating at a circular open top, the skirt extending outwardly at an angle substantially ranging between 40° and 50° from a horizontal plane such that the body may be received within a wide range of single serving drinking vessels with the skirt in abutting contact against the mouth of the vessel, said body further being geometrically proportioned to accommodate a particular measure of water, the lower end of the body defining a plurality of drainage openings, a filter cup conforming to the frustoconical body, means forming an annular groove on the interior surface of the skirt, a partition disc adapted for snap fitting assembly within the body with the peripheral edge of the disc being seated within the annular groove for lockingly engaging the side wall of the filter cup between the partition disc and annular groove, said partition disc being positioned in overlying relationship with respect to the filter cup to provide an enclosed infusion chamber for holding a measure of roasted and ground coffee, said coffee occupying a volume within the infusion chamber being substantially less than the volumetric capacity of the chamber to compensate for swelling of the coffee ground during the brewing operation, an outflow control means for permitting controlled gravity flow of a charge of hot brewing water through said body for optimizing the coffee extraction rate including a plurality of apertures in the partition disc permitting entrance of brewing water into the infusion chamber and the brewing of the coffee, and further including a rib structure on the lower end of the body, said filter cup being supported above the lower end by said rib structure, whereby the coffee beverage flowing through the filter cup from the infusion chamber passes through the drainage openings without deposit of coffee grounds and a fresh coffee beverage may be brewed directly over and served in a drinking vessel selected from a wide range of vessel shapes and sizes.

2. A coffee beverage drip brewer as claimed in claim 1 wherein the coffee within the infusion chamber occupies approximately two thirds of the volume of the infusion chamber.

3. A coffee beverage drip brewer as claimed in claim 2 wherein the body is geometrically proportioned to accommodate approximately six and one half ounces of hot brewing water.

4. A coffee beverage drip brewer as claimed in claim 1 further including a removable tape, the apertures in the partition being selectively closed with the tape, the tape being removed prior to brewing to permit the passage of brewing water through the apertures, whereby the freshness of the coffee measure is preserved and the dispersion of particulate matter is prevented.

5. A coffee beverage drip brewer as claimed in claim 1 further including a plurality of like brewers, each of said brewers being nestably seated within a juxtaposed brewer for shipment and dispensing whereby but a modicum of space is required for shipment and storage while shelf life of the coffee is preserved.

6. A coffee beverage drip brewer constructed in accordance with claim 1 wherein the body is formed of molded styrofoam construction, whereby the brewer may be discarded after use.

7. A coffee beverage drip brewer as claimed in claim 1 wherein the body skirt is inclined upwardly and outwardly at an angle in the order of 45° to facilitate the emplacement of the brewer over a wide range of drinking vessels.

8. A coffee beverage drip brewer as claimed in claim 1 wherein the infusion chamber is constructed as a cassette formed of the filter cup and the partition disc whereby the cassette only may be discarded after use.

* * * * *